United States Patent

Getzlaff et al.

[11] Patent Number: 5,594,876
[45] Date of Patent: Jan. 14, 1997

[54] ARBITRATION PROTOCOL FOR A BIDIRECTIONAL BUS FOR HANDLING ACCESS REQUESTS TO A LOGICALLY DIVIDED MEMORY IN A MULTIPROCESSOR SYSTEM

[75] Inventors: Klaus J. Getzlaff, Schoenaich; Udo Wille, Holzgerlingen, both of Germany

[73] Assignee: International Business Machines Corporation, Armonk, N.Y.

[21] Appl. No.: 514,355

[22] Filed: Jul. 27, 1995

Related U.S. Application Data

[63] Continuation of Ser. No. 81,757, Jun. 23, 1993, abandoned.

[30] Foreign Application Priority Data

Jun. 24, 1992 [EP] European Pat. Off. .............. 92110650

[51] Int. Cl.$^6$ .................................................. G06F 13/00
[52] U.S. Cl. ........................................ 395/293; 395/729
[58] Field of Search .................................. 395/425, 280, 395/725

[56] References Cited

U.S. PATENT DOCUMENTS

| | | | |
|---|---|---|---|
| 4,402,040 | 8/1983 | Evett . | |
| 4,467,419 | 8/1984 | Wakai | 395/425 |
| 4,473,880 | 9/1984 | Budde et al. . | |
| 4,621,342 | 11/1986 | Capizzi et al. . | |
| 4,775,955 | 10/1988 | Liu . | |
| 4,785,394 | 11/1988 | Fischer | 394/294 |
| 4,851,990 | 7/1989 | Johnson et al. | 395/325 |
| 4,959,776 | 9/1990 | Deerfield et al. | 395/400 |
| 5,060,145 | 10/1991 | Scheuneman et al. | 395/425 |
| 5,133,059 | 7/1992 | Ziegler et al. | 395/425 |
| 5,179,708 | 1/1993 | Gyllstrom et al. | 395/725 |
| 5,222,223 | 6/1993 | Webb, Jr. et al. | 395/425 |
| 5,257,356 | 10/1993 | Brockmann et al. | 395/290 |
| 5,261,109 | 11/1993 | Cadambi et al. | 395/291 |
| 5,276,900 | 1/1994 | Schwede | 395/800 |
| 5,287,477 | 2/1994 | Johnson et al. | 395/425 |
| 5,321,697 | 6/1994 | Fromm et al. | 371/10.1 |
| 5,323,489 | 6/1994 | Bird | 395/425 |
| 5,379,379 | 1/1995 | Becker et al. | 395/425 |
| 5,490,253 | 2/1996 | Laha et al. | 395/304 |

FOREIGN PATENT DOCUMENTS

| | | |
|---|---|---|
| 0054888 | 6/1982 | European Pat. Off. . |
| 0301921 | 1/1989 | European Pat. Off. . |
| 0379436 | 7/1990 | European Pat. Off. . |
| 63-91757 | 4/1988 | Japan . |

*Primary Examiner*—Jack B. Harvey
*Assistant Examiner*—David A. Wiley
*Attorney, Agent, or Firm*—Jenkens & Gilchrist; Eugene I. Shkurko

[57] ABSTRACT

The invention concerns a multiprocessor system comprising processors PU0 to PUn and a common main memory. The memory is logically divided into at least two banks M0 and M1 and is interconnected with the processors by a bus 110. By means of control lines 111 to 118 a bus protocol is established so that one of said memory banks is accessed while another one of said banks is still busy.

9 Claims, 13 Drawing Sheets

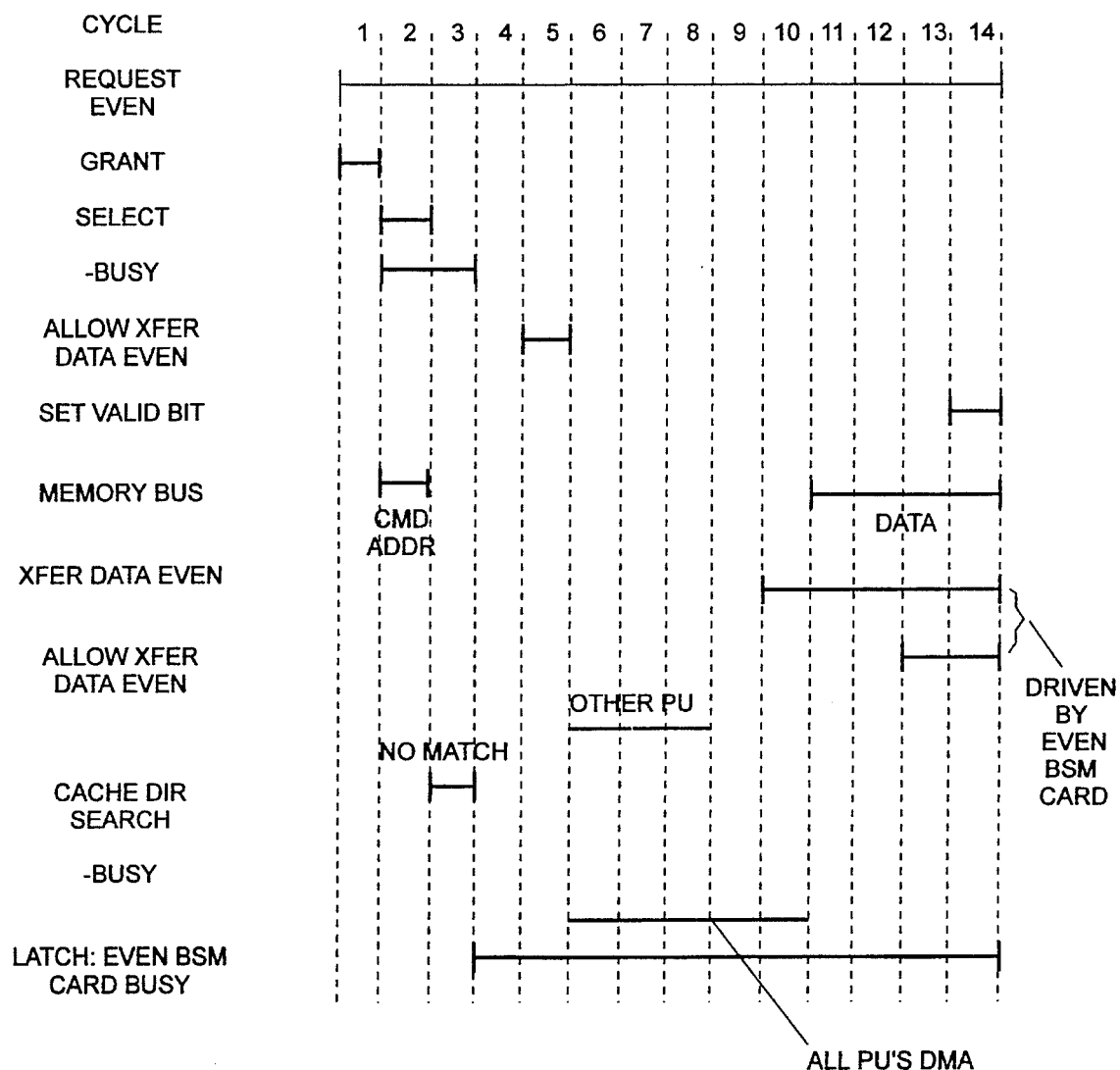

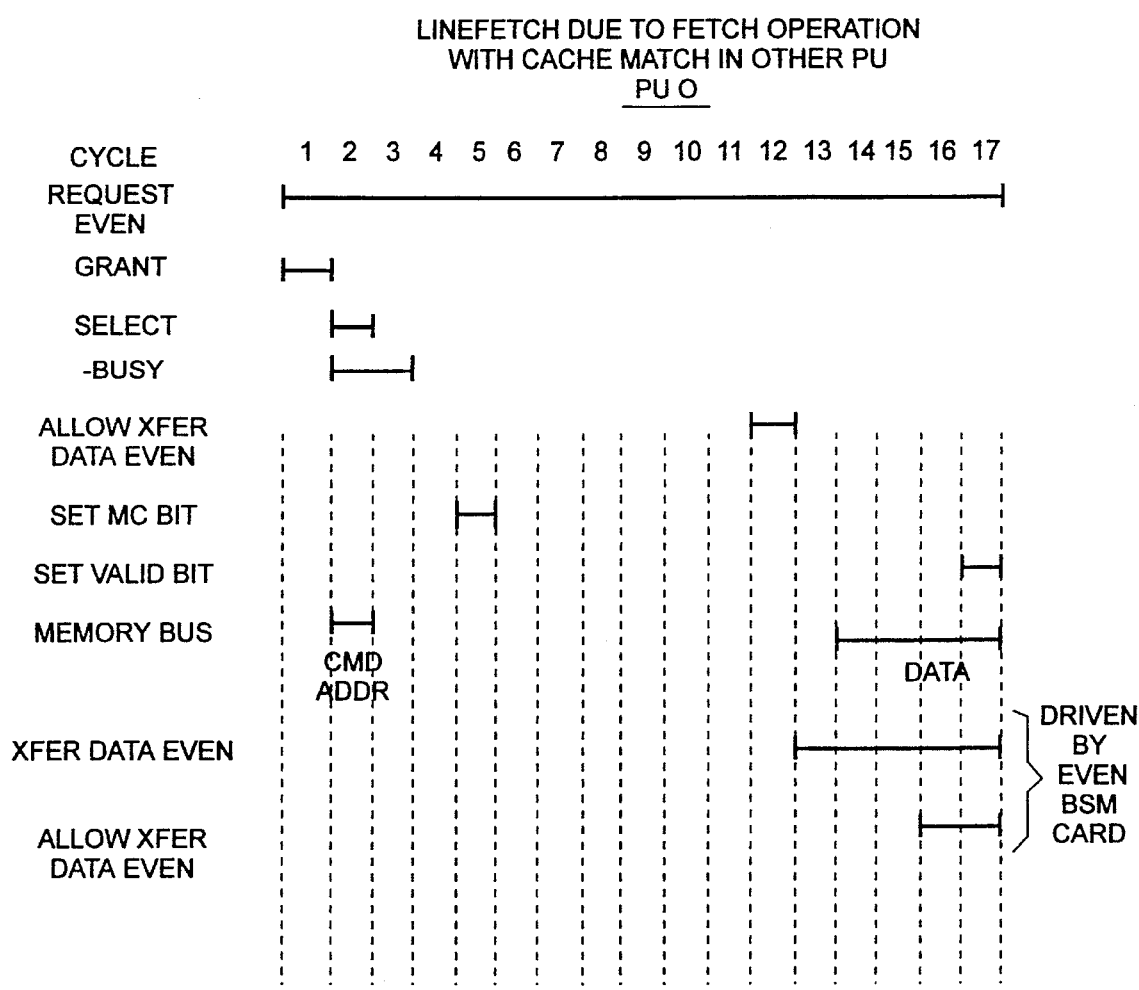

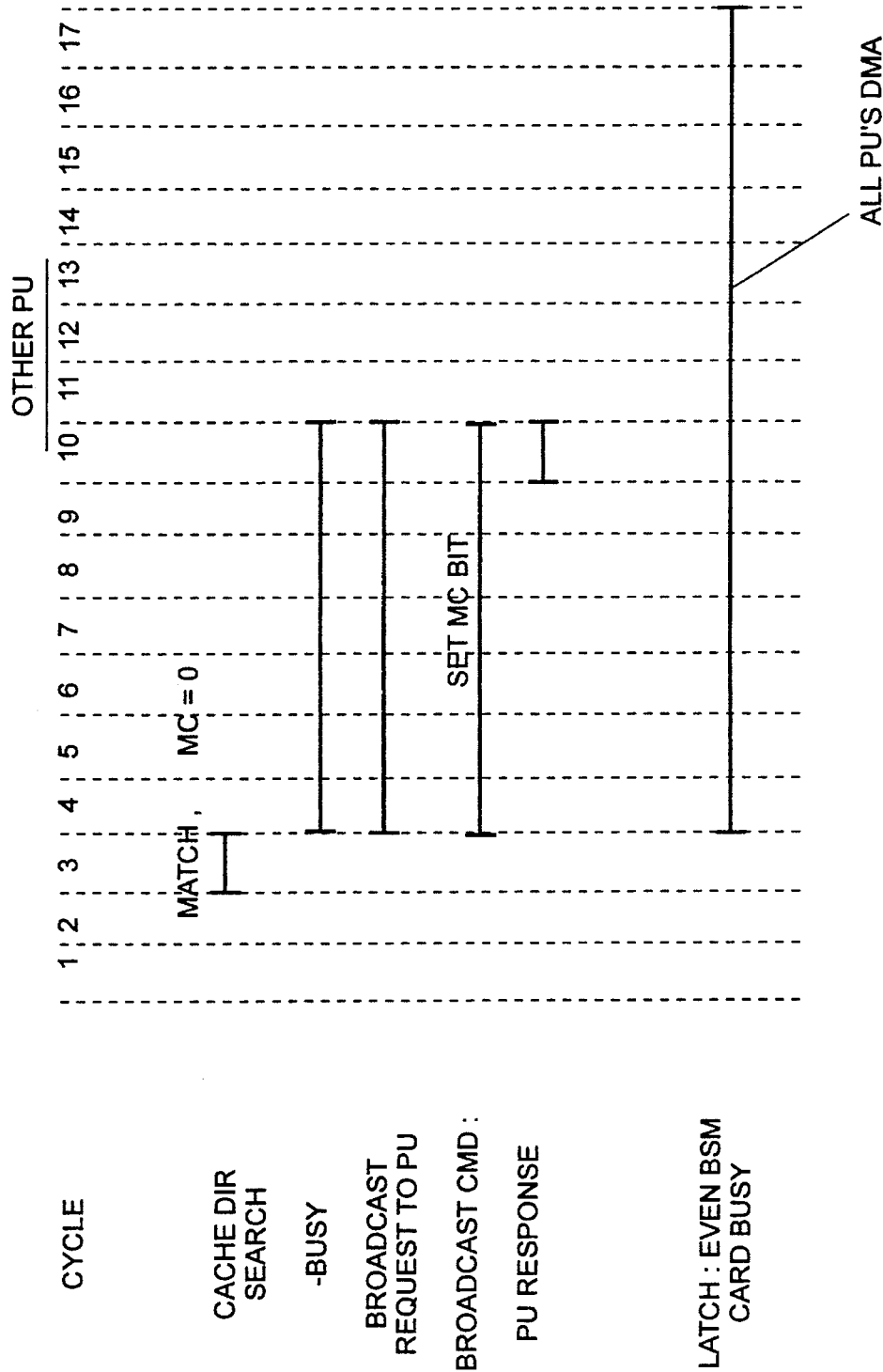

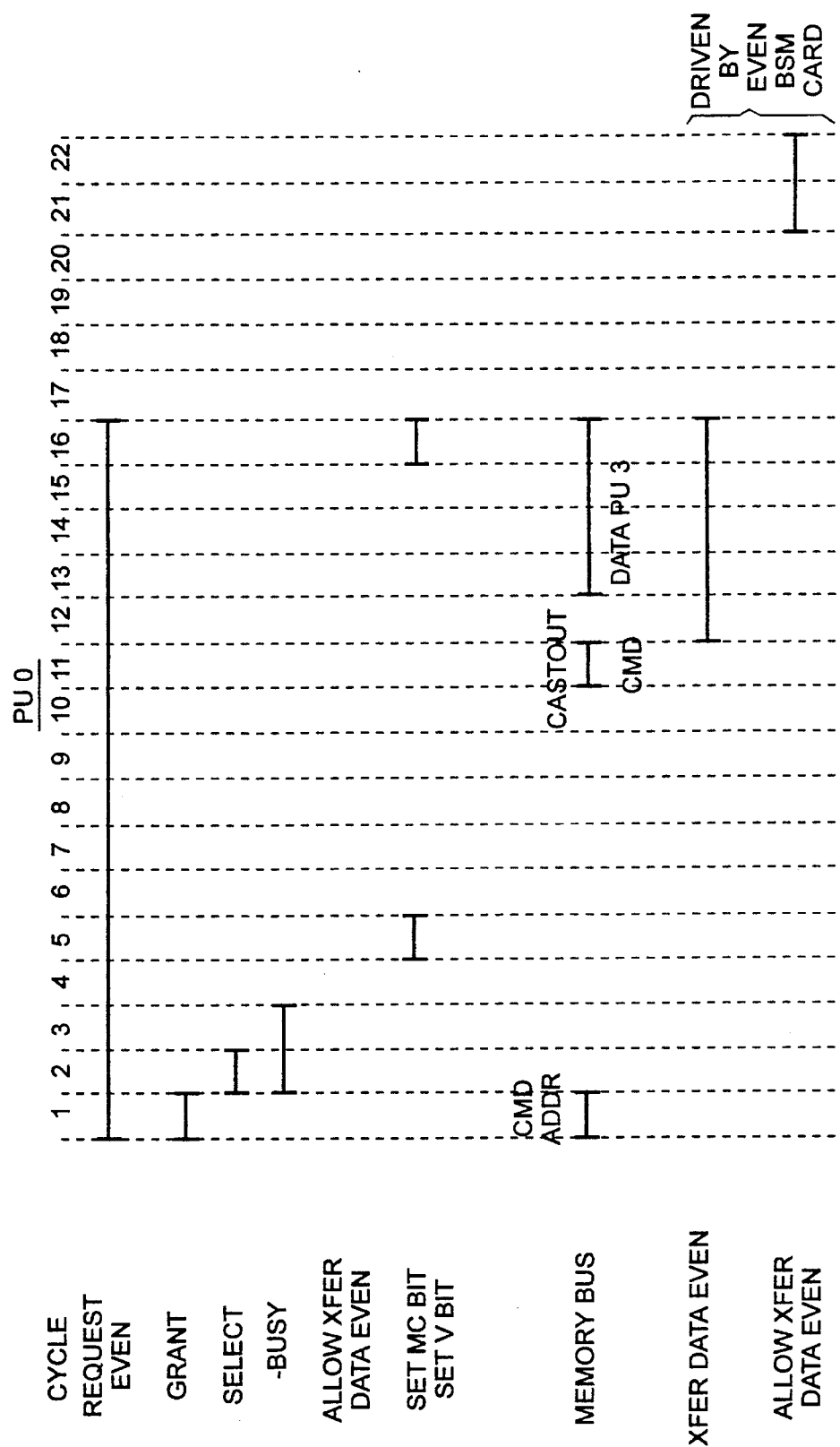

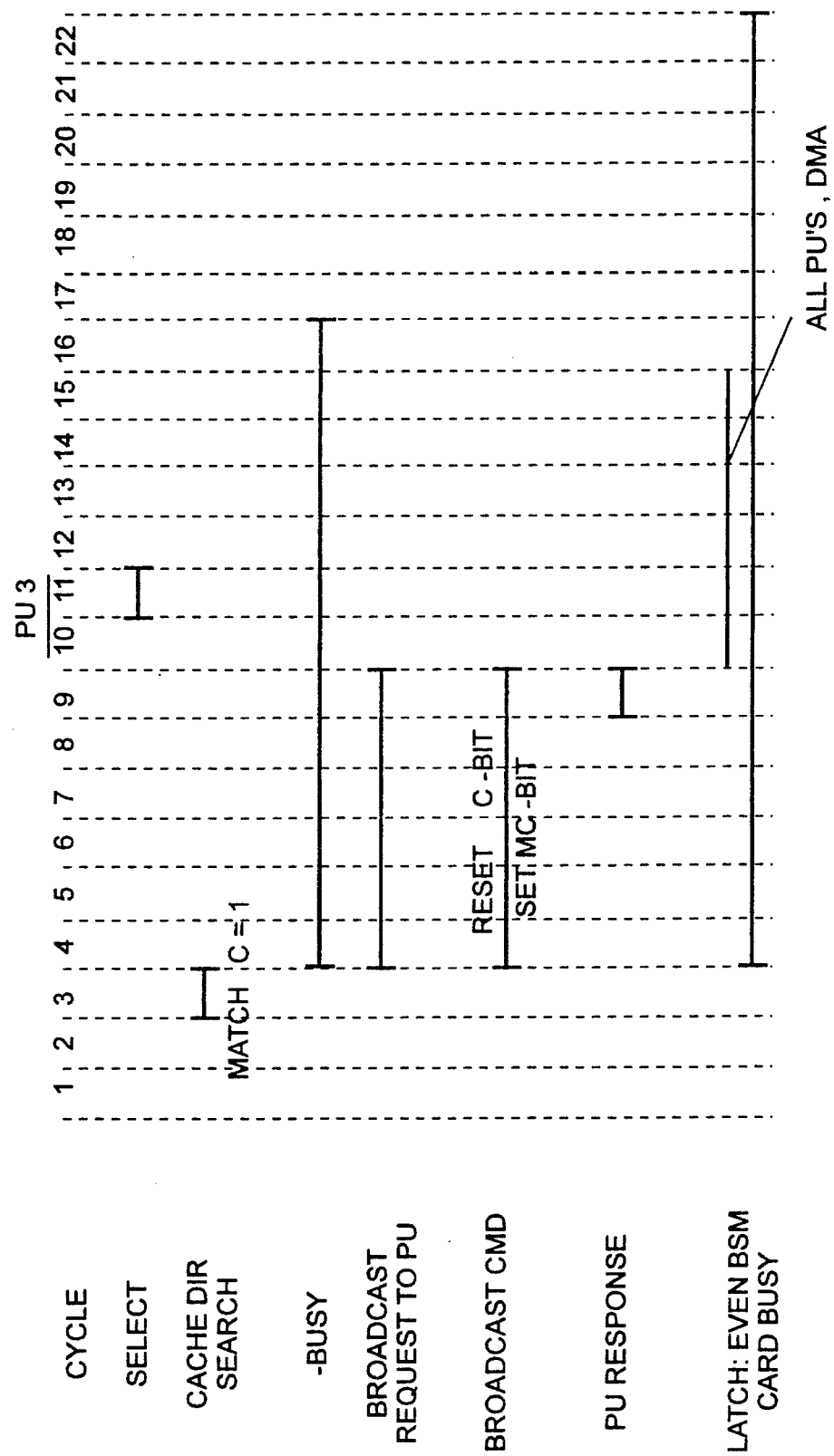

RELATIVE PERFORMANCE n-way multiprocessors

ARBITRATION PROTOCOL FOR A BIDIRECTIONAL BUS FOR HANDLING ACCESS REQUESTS TO A LOGICALLY DIVIDED MEMORY IN A MULTIPROCESSOR SYSTEM

The application is a continuation, of application Ser. No. 08/081,757, filed Jun. 23, 1993, now abandoned.

TECHNICAL FIELD

The invention concerns a multiprocessor system comprising at least two processors, storage means and bus means for transmitting information between the processors and storage means. Further the invention concerns a method for granting access to a common bus means in a multiprocessor system.

1. Background of the Invention

In a distributed processing system comprised of a plurality of elements interconnected by at least one bus, a method of arbitration is required to determine which element will use the bus first when two or more elements attempt to use the bus simultaneously. Various methods and apparatuses are known in the prior art for interconnecting such a system which may be comprised of elements functioning as processors, mass memories and input/output controllers.

2. Description of the Prior Art

One method of prior art bus arbitration provides for a central arbiter to communicate with all the elements desiring to use a bus simultaneously. This central bus arbiter determines the elements with the highest priority and sends out a command signal permitting this high priority element to use the bus. A significant disadvantage of this type of system is that signal transmission to the central bus arbiter from the requesting elements and vice versa takes a significant amount of time and thus slows down the entire system.

Another approach in the prior art for bus arbitration has been referred to as daisy chaining. In this method a bus available signal is transmitted from element to element in a priority order. An element desiring access to the bus captures the signal and thereby gets access to the bus. This is also a relatively slow arbitration method.

A third prior art method of bus arbitration provides for each device to simultaneously transmit its priority code as a string of pulses on signal lines separate from the main data bus. The number of signal lines is determined by the numbering system and coding techniques used. If pulse coding is used, pulses are sent to counters in each device. When a device receives a total count equal to its own priority code, it has won arbitration and gets access to the main data line. When the priority number received by the device counter does not equal its device priority number, the device withdraws from the arbitration process. This method of bus arbitration, however, requires additional signal lines and interface circuits for transmission and detection of device priority codes with the number of lines and circuits being determined by the numbering system and coding technique selected. The above mentioned prior art approaches are described in U.S. Pat. No. 4,402,040.

From U.S. Pat. No. 4,621,342 an arbitration circuitry for deciding access requests from a multiplicity of components is known. The arbitration devices are interconnected in a chain by a priority bus of branched binary structure divided into lines connected, within each device, to a logic network that is also connected to an internal bus extending from a priority code register. The priority bus, whose lines are normally at zero potential, is connected in any given device to the register thereof in the presence of an access request from the associated components whereupon its logic network determines whether the code on that bus equals the contents of the register. If so, the associated component is enabled by a control unit of the device to access the data bus.

There are various types of caches in prior art multiprocessor systems as described in U.S. Pat. No. 4,775,955. One type of cache is the store-through cache which does not interfere with a processor storing data directly to the main storage or a second level cache in order to always update changes of data to the down level storage hierarchy. Upon the update of a store to main storage, appropriate cross interrogate actions may take place to invalidate the copies of the cache line involved from the caches other than the one at the processor which initiates the store. Usual store-through designs require substantial main storage band width to incorporate the data stores, which normally average between ten to twenty percent of all processor storage requests.

Another type of cache design is the store-in cache. Store-in caches are described in U.S. Pat. Nos. 3,735,360 and 3,771,137. A store-in cache directory is described in detail in U.S. Pat. No. 4,394,731 in which each line in a store-in cache has its multiprocessor shareability controlled by an exclusive/read-only flag bit. The main difference between store-through and store-in caches is that all stores in a store-in cache are directed to the cache itself, which may cause a cache miss if the stored line is not in the store-in cache. Usually cache line modifications are updated to the main storage only when the lines are replaced from the cache. As a result the store-in cache design reduces the main storage band width requirement at the expense of more complex coherent control and the penalties of castouts. A cast out occurs when a data access from one processor finds the line modified in the cache of another processor.

There have been various cache coherence control mechanisms developed. Typical examples are: Global directory, broadcasting and memory tagging described in U.S. Pat. No. 4,775,955. In the global directory approach, the storage control elements contain copies of the processor cache directories, so that castout decisions may be resolved rather efficiently. The broadcasting approach routes storage requests from processors to all other processors if accesses cannot be resolved at local caches. The memory tagging approach tags each line in main storage to indicate or to approximate which processors have the line in their caches currently.

Another alternative is to have software control of the coherence of certain data for which efficient implementation of castout control may be constrained. The idea is to flush lines out of the private caches when there is a danger of data pollution through stores from other processors. Such pollution may occur when, for example, an object is released by a task running on a processor and hence tasks on other processors may obtain the resource and modify it. In some computer architectures there are instructions offered to flush data lines out of the cache. Such cache flush instructions are designed by specifying address ranges in which lines are to be replaced from the cache. Such approaches force the software, e.g. the compiler or the programmer, to keep track of the addressed ranges for flushing. Address range is a non-semantic specification of logical objects in software. Therefore, such cache flushing instructions make storage systems less transparent to software.

There are several techniques known for cache coherence controls. U.S. Pat. No. 4,484,267 deals with certain variations of the conventional cache coherence control mechanisms. It is trying to dynamically determine whether a cache line is potentially subject to future cross interrogation and tries to do store-through on such lines in order to reduce the penalties of ping-ponging. In this theme conventional global storage control elements directory control is needed to do invalidates.

Other techniques for cache coherence control are known for example from U.S. Pat. Nos. 4,293,910, 4,400,770, 4,400,773, 4,399,504, and 4,099,243. A further concept to maintain data consistency is known from an article entitled "Data Consistency in a Multiprocessor System with Store-In Cache Concept", Microprocessing and Microprogramming 32 (1991) 215–220, North-Holland, by G. Doettling. This article addresses the problems of maintaining data consistency in a multiprocessor system with an embedded cache on each processor. Common system resources are used to achieve data integrity under any circumstances. Special attention is given to keep the overhead for cache cross interrogation low. In addition a store-in cache concept is used to reduce the wait cycles for memory access. Even though any one of the above referenced prior art cache concepts may be employed in a multiprocessor system according to the invention, it is particularly valuable to employ the concept as described by G. Doettling in the above cited article.

A common disadvantage of the above described prior art approaches is that system performance does not increase linearly with an increasing number of processors connected to the common bus.

It is thus an object of the present invention to provide an improved multiprocessor system and an improved method for granting access to a common bus in a multiprocessor system.

The object of the invention is solved by the features laid down in the independent claims.

In multiprocessor systems bus arbitration is a crucial issue, since it substantially effects the entire system's performance. In the above described prior art approaches the problem of bus arbitration is always solved, so that only one bus participant may have access to the bus at a time. If a processor issues a command to the main memory via the bus in order to fetch data from the memory, the bus is exclusively assigned to the requesting processor for the time it takes to carry out the data fetch operation.

SUMMARY OF THE INVENTION

In contrast the inventive concept allows multiple accesses of bus participants to the memory (storage). If a first processor raises a request to access the memory, access to the bus is granted by arbitration means according to the invention. Then the processor puts its command to the memory to fetch data from the memory on the bus. When the memory receives the command, it begins to fetch the desired data from its internal storage array and puts the data in its internal buffer, while the requesting processor is waiting to receive the data from the memory. After the desired data is present in the buffer of the memory, the data are sent in one or more shots via the bus to the processor.

According to the teaching of the invention the time needed for the memory to access its internal storage array is advantageously used. After the first processor issued its command to the memory, the bus is unused even though it is assigned to the first processor, since the memory is still busy. During this time period, while the memory is still busy, a second bus participant may get granted access to the bus to issue a command to the memory. This is possible since the memory is logically divided into at least two memory banks according to the teaching of the invention. Thus, if the first processor accesses a first memory bank, a second processor may already access a second bank, while the first bank is still busy. If the second access to the bus is also due to a data fetch command to the memory, the first bank has the required data available in its buffer a little earlier than the second bank. Consequently, the data stored in the buffer of the first bank is transmitted to the first processor which requested the corresponding data, followed by the data which is stored in the buffer of the second bank requested by the second bus participant. If the time needed for the memory to access its internal storage array and to store the requested data in its internal buffer is sufficiently long, multiple grants may occur during this time delay.

According to a first preferred embodiment of the invention, the arbitration is performed by arbitration means based on a predetermined ranking of the bus participants, such as the processors. The arbitration means comprises means for storing a queue of processor requests, such as a plurality of latches. For each bank and for each processor, there is a queue stored in the arbitration means, whereby a processor request to access one of the banks is queued in the corresponding queue only under certain conditions. First, it is necessary that a request of a higher ranking processor is already queued. Second, in the case that such a request is not queued, it is necessary that a request of a lower ranking processor is not already queued.

If the request is queued, access to the bus is granted subsequently under the condition, that there is no request of a higher ranking processor queued. It is to be noted that there is a queue for each of the banks, so that subsequent grants due to access requests to different ones of the banks of the memory may occur consequently.

It is possible to realize this arbitration by a central arbiter being interconnected to all participants. In this case each bus participant is interconnected to the central arbiter in order to transmit requests to access one of the banks via the bus to the arbiter. Further, this necessitates that the central arbiter is interconnected with each of the bus participants to grant access to the bus.

However, in cases where minimum wiring length is required, a distributed arbiter is advantageous. In this case each of the bus participants has its private arbiter for each of the banks of the memory.

According to a preferred embodiment of the invention each of the processors has at least one private high-speed hardware managed buffer, such as a cache. In a multiprocessor system there can be many processors sharing the same main storage. Therefore each processor is always required to obtain the most recently updated version of data when an access is issued. This requirement takes hardware control of data consistency among caches, which is often known as the cache coherence problem.

In the following, preferred embodiments of the invention are described in more detail with reference to the drawings.

BRIEF DESCRIPTION OF THE DRAWINGS

FIGS. 7, 8a, 8b, 9a, 9b, 10, and 11 show timing diagrams of different bus operations.

DESCRIPTION OF THE PREFERRED EMBODIMENT

Figure 1:
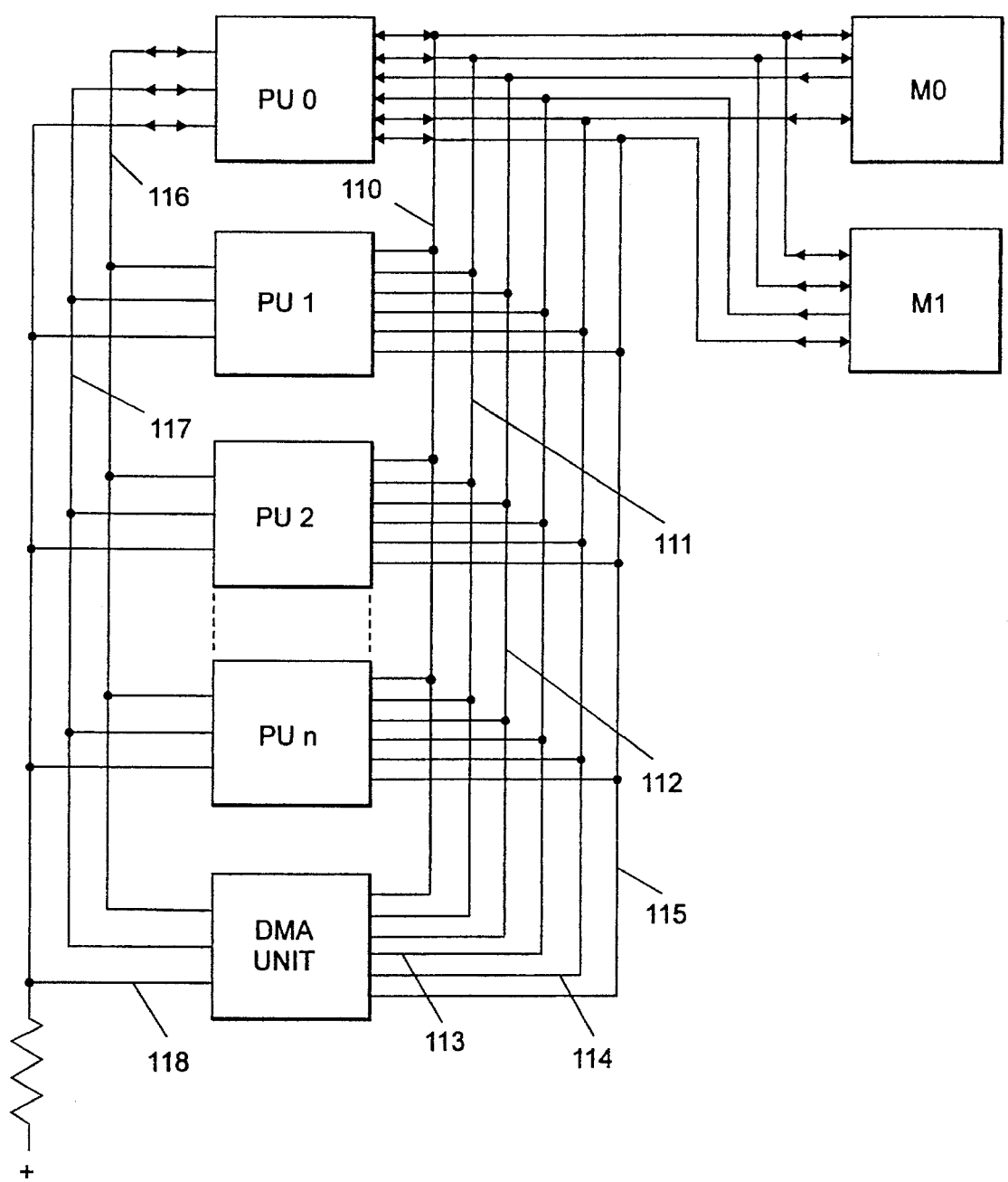
FIG. 1 is a schematic representation of a multiprocessor system according to the invention.

FIG. 1 shows the structure of a preferred embodiment of the invention. A plurality of processors PU0, PU1, PU2, . . . , PUn as well as a direct memory access unit DMA are connected to common storage means M0, M1 by a memory bus 110 and control signals 111, 112, 113, 114 and 115. In this case the storage means is a random access memory.

The direct memory access unit DMA is an I/O adapter which controls input/output requests for memory data. The access to the memory bus 110 is controlled by arbitration means. In this preferred embodiment of the invention each processor and the DMA unit comprises an arbiter for each of the memory banks M0 and M1. The arbitration is done based on control signals 116, 117 and 118.

In the preferred embodiment of the invention shown in FIG. 1 the memory is divided into two banks M0 and M1. Each of the memory banks M0 and M1 is interconnected to the bus participants by the common memory bus 110 which in this example is 16 bytes wide. Further the memory banks are interconnected to the bus participants by the control signal lines 111, 112, 113, 114 and 115. These control signals are needed to establish a bus protocol. The bus protocol together with the arbitration means is to control bus access of the bus participants. Control signal lines 116 and 117 are further busses to communicate bus access requests of the bus participants between the arbiters. Control signal line 116 is to transmit requests to access memory bank M0 whereas control signal line 117 is to transmit requests to access memory bank M1. Further the arbiters of the bus participants are interconnected by a further control signal 118. It is to be noted that the memory bus 110, as well as control signal lines 111, 114, 115, 116, 117 and 118 are bidirectional, whereas control signals 112 and 113 are unidirectional as indicated by the corresponding arrows in FIG. 1.

Figure 2:
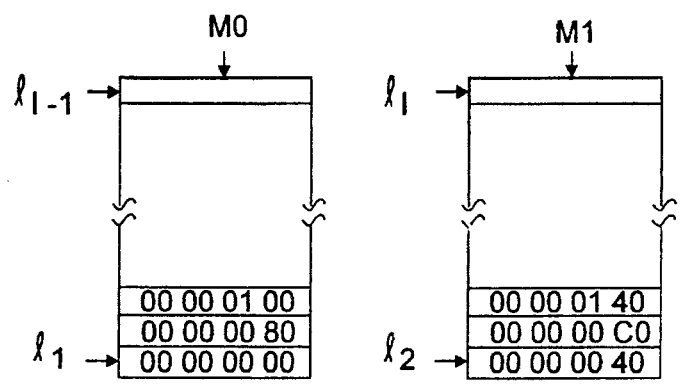
FIG. 2 shows the distribution of data in the main memory of the multiprocessor system.

FIG. 2 shows an example, how the memory addresses are distributed over the two banks M0 and M1. This is symbolized by the boxes M0 and M1 shown in FIG. 2. Each row in these boxes indicates a storage line 1 starting with the lowest address at the bottom of the box M0. In this example a line size of 64 bytes is assumed. The first line $1_1$ starts with address 0 in memory bank M0, whereas the second line starts with address 64 or 40 in the hexadecimal notation in memory bank M1. The numbers in the boxes M0 and M1 shown in FIG. 2 indicate the starting addresses of corresponding storage lines in the hexadecimal system. The lines $1_1, 1_2, \ldots, 1_i, 1_j$ are assigned alternately to the memory banks M0 and M1. Thus the main memory comprising memory banks M0 and M1 is logically divided into two different banks. The memory banks M0 and M1 may be comprised in one main memory device. They may also be realized in physically separated hardware units, such as an even and an odd basic storage module (BSM) card.

The advantage of two or more memory banks on a heavily loaded memory bus is "bus interleaving". One bus participant can select one bank and during the initial access time, which is necessary for the storage card to access its internal array and fill its fetch buffer, another bank can be selected by another bus participant. In this example line transfer from the first, then from the next bank is done in multiple shots. This example assumes 16 bytes per shot.

Figure 3:
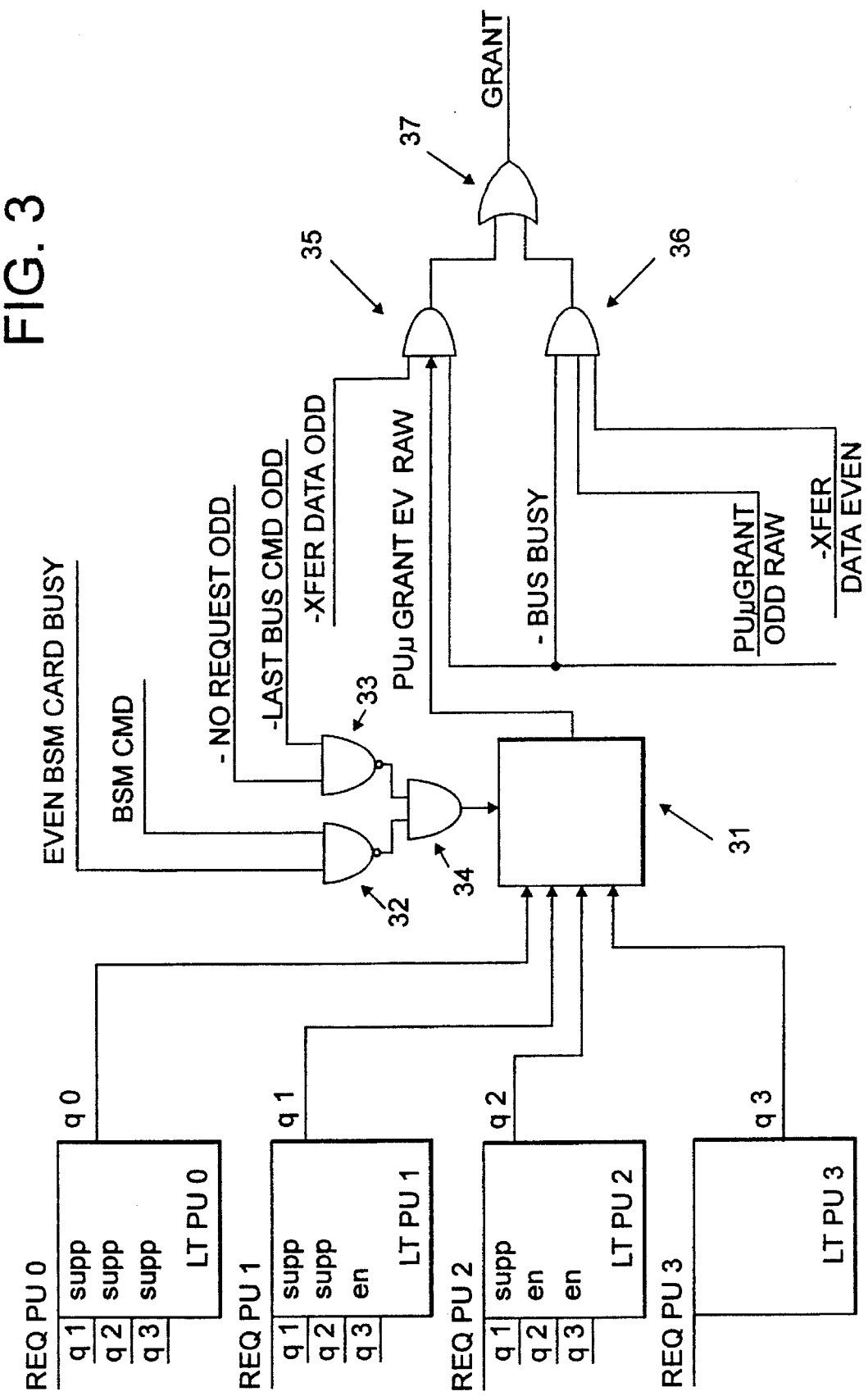
FIG. 3 is a schematic block diagram of an inventive arbiter.

FIG. 3 shows an example of an arbiter according to the invention. The arbiter shown in FIG. 3 is to control arbitration to the even memory card M0, which in this case is a basic storage module (BSM). Each processor comprises an arbiter as shown in FIG. 3 as well as a further arbiter to access the odd memory bank M1. In the example shown in FIG. 3 a set of four processors PU0 to PU3 is assumed. The signal lines REQ PU0 to REQ PU3 form part of the control signal line 116 shown in FIG. 1. If the processor PU1 for example needs access to the memory bus 110 it raises its request line REQ PU1. The signal lines REQ PU0 to REQ PU3 are connected to corresponding circuits LT PU0 to LT PU3. These circuits have outputs q0 to q3. These outputs also serve as inputs to the circuits LT PU0 to LT PU2.

The circuits LT PU0 to LT PU3 serve to store or latch requests of the processors PU0 to PU3. If a request is stored, this is indicated by the corresponding output q. Circuits LT PU0 to LT PU2 have additional inputs denoted supp and en. If a signal at an input supp is active, a request of the corresponding processor may not be stored in the corresponding circuit. If however a signal at an input en is active this enables the circuit to store the request of its corresponding processor regardless of the condition of other inputs supp. The last one of those circuits LT PU3 shown in FIG. 3 has no such additional inputs. This is because the predetermined ranking of the processors in this case is PU0, PU1, PU2, PU3, where PU0 has the highest and PU3 has the lowest priority. Therefore a request of the lowest ranking processor PU3 is stored or latched in its corresponding circuit LT PU3 regardless of other processor requests. Each of the signals q0 to q3 indicates whether a request is stored in the corresponding circuit LT PU0 to LT PU3. The signals q0 to q3 are fed to a circuit 31 which serves to generate the signal PUμ GRANT EV RAW. The signals EVEN BSM CARD BUSY and BSM CMD are fed to the AND/INVERT gate 32 whereas the signals —NO REQUEST ODD and —LAST BUS COMMAND ODD are fed to the AND/INVERT gate 33. The outputs of AND/INVERT gates 32 and 33 are fed to the AND gate 34. The output of AND gate 34 is also fed to the circuit 31. The output of the circuit 31 which is the signal PUμ GRANT EV RAW is fed to the AND gate 35 as well as the signals —BUS BUSY and —XFER DATA ODD. The inputs of AND gate 36 are the signals —XFER DATA EV, PUμ GRANT ODD RAW and —BUS BUSY. The outputs of AND gates 35 and 36 are fed to the OR gate 37. The output of OR gate 37 is the signal GRANT. The signal GRANT permits access to the bus for a certain processor.

Figure 4:
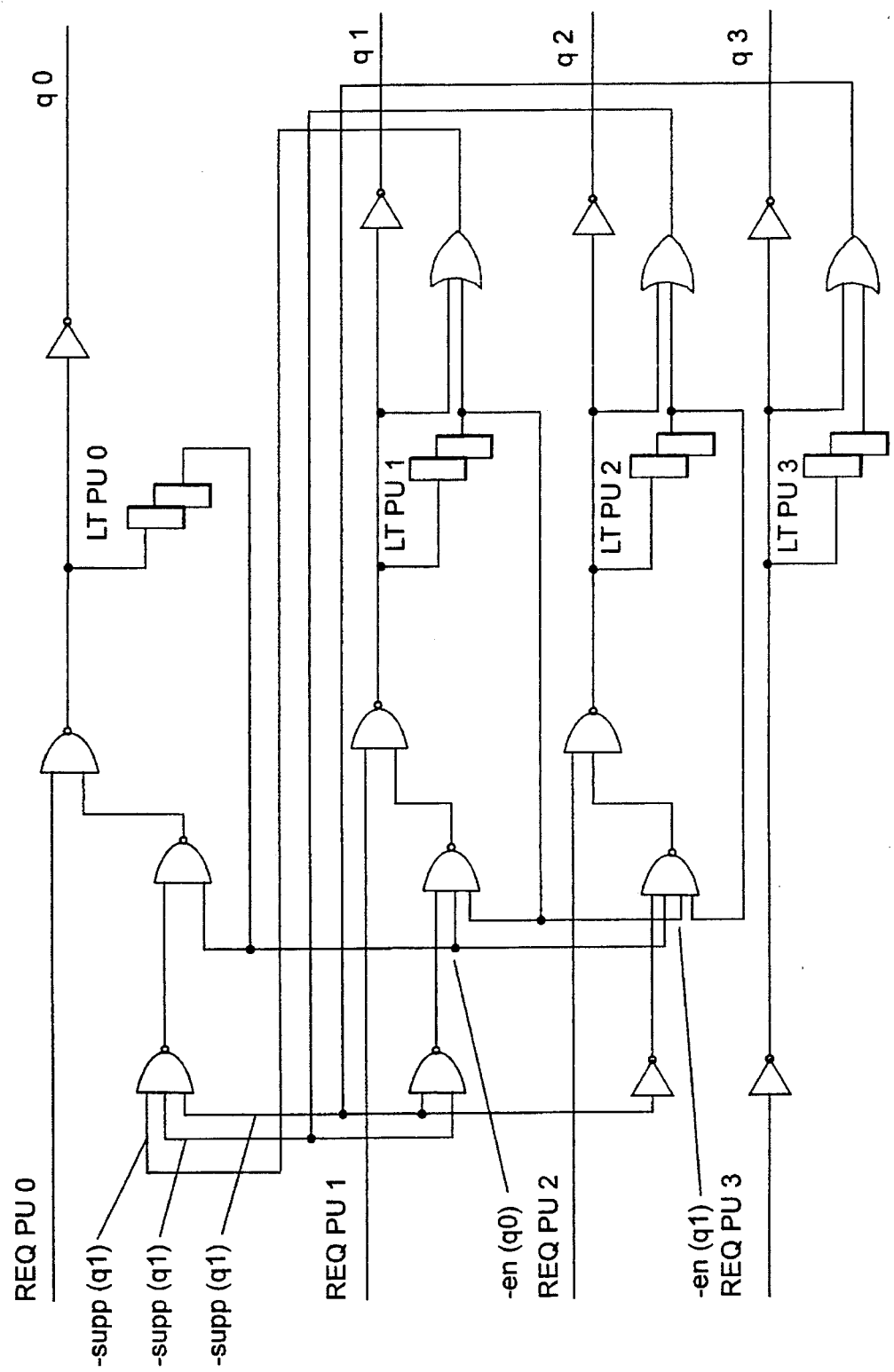
FIG. 4 shows a preferred embodiment of the inventive arbitration circuit.

In FIG. 4 a preferred embodiment of the inventive arbitration circuit is depicted in more detail. The master slave latches LT PU0', LT PU1', LT PU2' and LT PU3' store queued requests of the corresponding processor PU0, PU1, PU2 and PU3, respectively. The negative signal stored in these master slave latches is a queued request. All latch outputs are positive and thus at logically one when the queue is empty. The inverted inputs to these latches are the signals q0, q1, q2 and q3 which are fed to the circuit 31 of FIG. 3.

The preferred embodiment of the arbitration circuit shown in FIG. 4 differs from that shown in FIG. 3 as regards the inputs supp and en of the circuits LT PU0 to LT PU3 of FIG. 3. In the preferred embodiment shown in FIG. 4 the signals —supp (q1), —supp (q2) and —supp (q3) are generated by the ORed inputs and outputs of the latches LT PU1' to LT PU3', respectively. These signals which are fed to AND/ INVERT gates serve the same purpose as the signals q1, q2 and q3 which are fed to the inputs supp in the preferred embodiment shown in FIG. 3. Since the latches LT PU1' to LT PU3' are bypassed, "GRANT" is delayed only by circuit delay but not by the additional time it takes to store a request in the master slave latches which is one additional cycle. With the dropping of a request REQ PUμ, the associated signal —supp (qμ) becomes inactive and a higher ranking processor may get the "GRANT" signal without an additional time delay of one machine cycle. This is because the signal —supp (qμ) already becomes inactive before the corresponding latch output LT PUμ' becomes positive due to the dropped request of the processor PUμ. Thus a dropping request immediately allows a grant signal to another waiting processor.

Another reason why the signals —supp (qμ) are generated in the above described way is to avoid excessive delay paths. Such a path would be possible if all signals REQ PU0 to REQ PU3 became active in the same machine cycle and the signal REQ PU3 would travel as —supp (q3) through all the logic and would influence the signals q0 to q3.

The output of the latches LT PU0' and LT PU1' are the signals —en (q0) and —en (q1) which are fed to their corresponding AND/INVERT gates. The signals —en (q0) and —en (q1) serve the same purpose as the signals q0 and q1 applied to the corresponding inputs en of the circuits LT PU1 and LT PU2 of FIG. 3.

Figure 5:
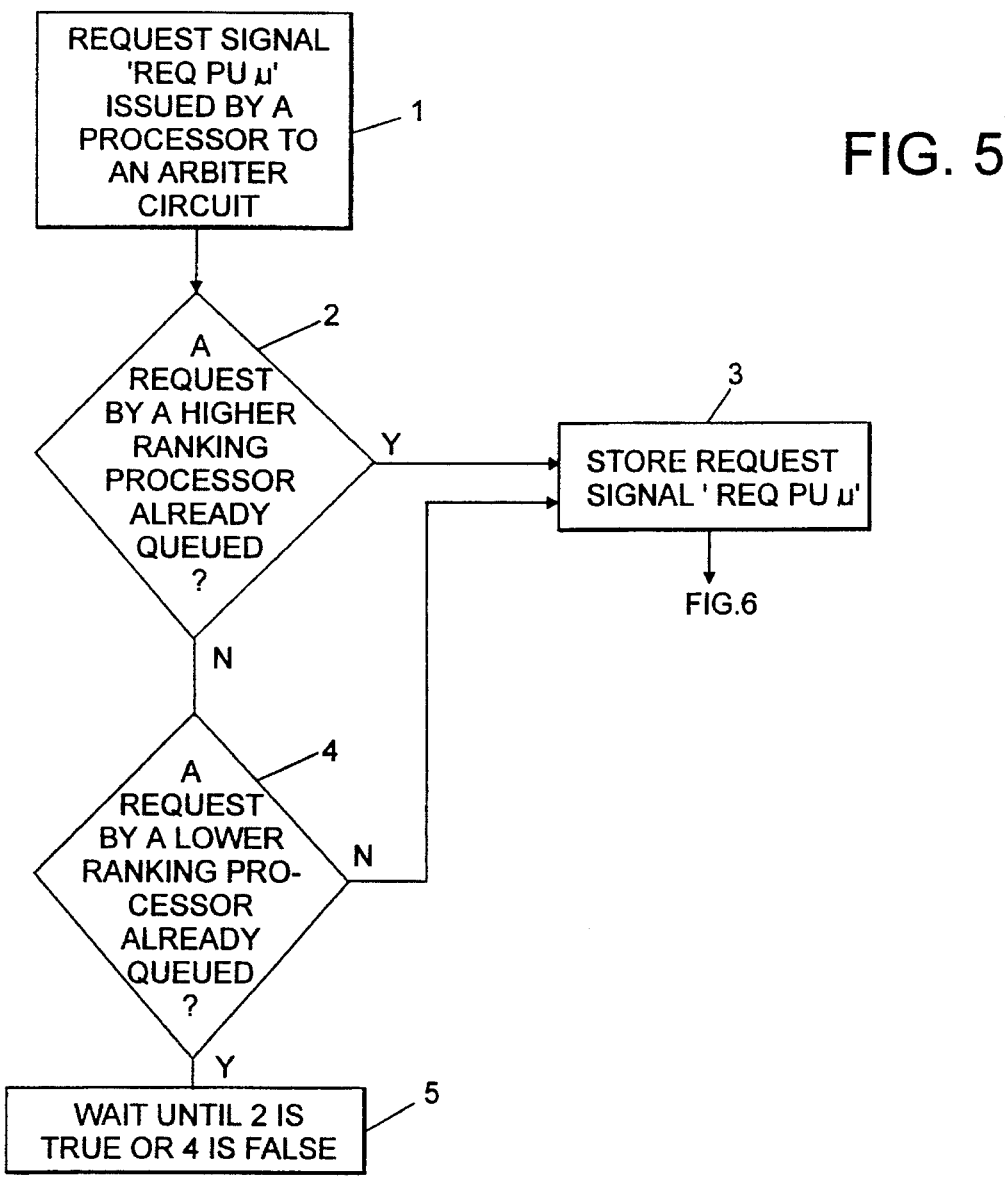
FIGS. 5 and 6 are flow-charts illustrating the arbitration method according to the invention.
Figure 6:
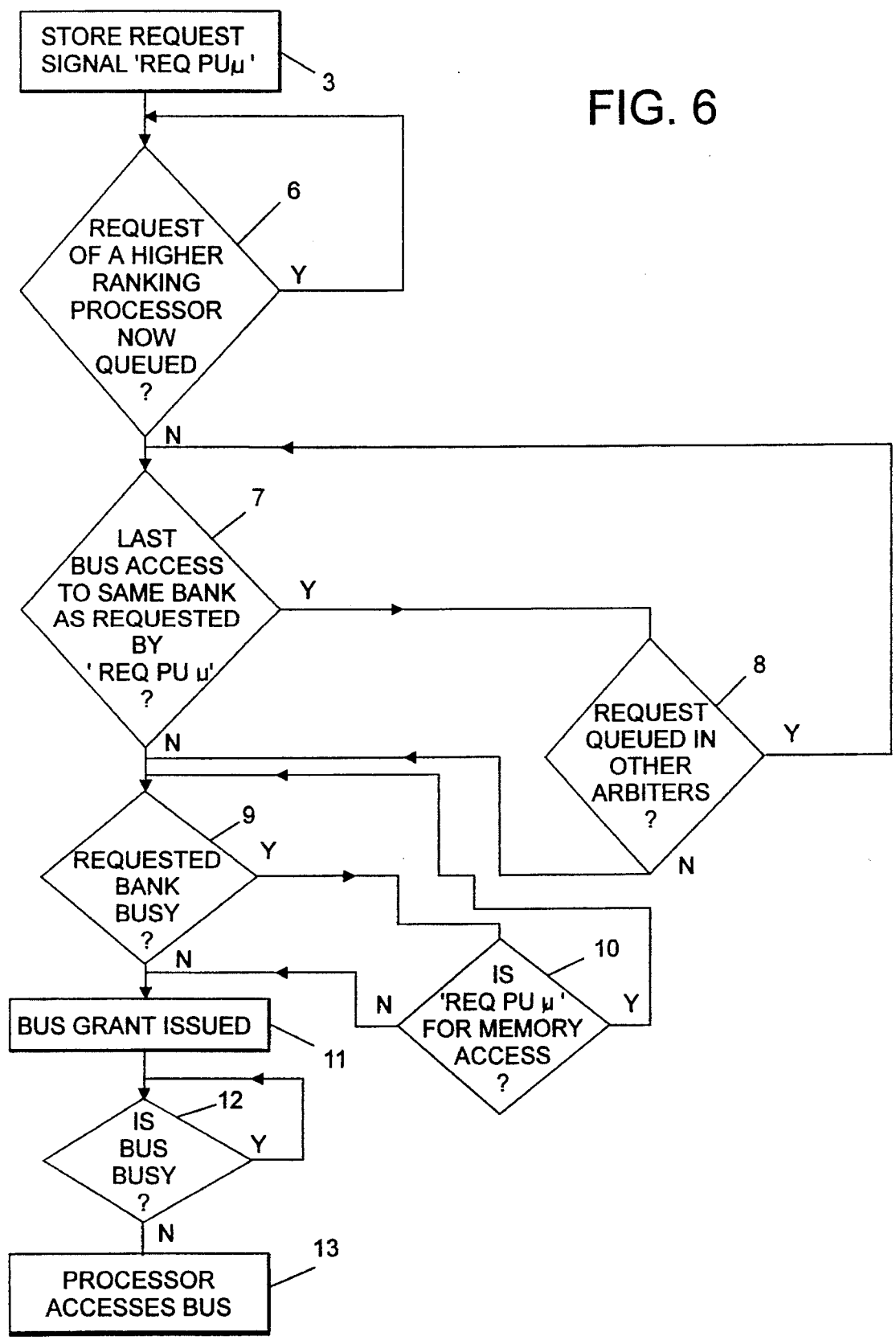

With reference to FIG. 5 and 6 it is described in more detail in the following how the signal GRANT is generated in the arbiter shown in FIG. 3. First it is explained by reference to FIG. 5 how a request of an arbitrary processor PUμ is stored in the corresponding circuit LT PUμ.

In step 1 the signal REQ PUμ indicates that the processor PUμ requests access to the memory bus. In this preferred embodiment of the invention the memory is logically divided into two banks M0 and M1. Thus each processor comprises one arbiter for each memory bank. The arbiter shown in FIG. 3 is for the even memory bank whereas the arbiter for the odd memory bank M1 is not shown. Thus if the signal REQ PUμ connected to the even arbiter indicates an access request, this implies that the processor PUμ requires access to the even memory bank M0. If the signal REQ PUμ indicates an access request of the processor PUμ in step 1 as shown in the flow-chart in FIG. 5, it is decided in the following, whether the request of a higher ranking processor PUμ+x to access the even memory bank M0 is already stored in its corresponding circuit LT PUμ+x. The ranking of the processors is predefined. The address of a processor may define its rank, whereby the lowest processor address corresponds to the highest rank. However other definitions of the ranking of the processors are possible.

The decision of step 2 is based on the signals q0 to q3 shown in FIG. 3, since these signals indicate whether a request is stored in one of the circuits LT PU0 to LT PU3. If it is decided in step 2, that there is any higher ranking processor PUμ+x which has its request to access the even memory bank M0 latched in its corresponding circuit LT PUμ+x, this enables storing of the request of the processor PUμ in the corresponding circuit LT PUμ in step 3. If for example the processor PU1 raises a request to access the even memory bank M0, this is indicated by the signal REQ PU1 shown in FIG. 3. This request is stored in the circuit LT PU1 if the signal q0 indicates, that a request of the higher ranking processor PU0 is already stored in its corresponding circuit LT PU0. The signal q0 enables this storage operation regardless of the state of the signals q2 and q3.

If it is decided in step 2, that no higher ranking processor PUμ+x has its request to access the even memory card M0 stored in its corresponding circuit LT PUμ+x, step 4 is carried out. In step 4 it is decided, whether any lower ranking processor PUμ-x has its request to access the even memory bank M0 stored in its corresponding circuit LT PUμ-x. If this is not true, step 3 is carried out, so that the request of the processor PUμ is stored in its corresponding circuit LT PUμ. If this is true, the request of the processor PUμ is not stored. Thus the requesting processor PUμ has to wait in step 5 until the above described conditions to carry out step 3 are fulfilled.

If in the example shown in FIG. 3 the requesting processor is the processor PU1 and the circuit LT PU1 is not enabled by the signal q0, a request of the processor PU1 is stored only under the condition that none of the signals q2 or q2 indicate that any lower ranking processor PU2 or PU3 has its request stored in its corresponding circuit LT PU2 or LT PU3.

The same procedure applies for a request of processor PUμ to access another one of the memory banks; in this example the memory bank M1. It is to be noted that this concept is not restricted to any specific number of memory banks.

With reference to FIG. 6 now it is described in more detail how the signal GRANT is generated by the arbiter circuit shown in FIG. 3 from the signals q0 to q3. In the following it is assumed that the arbiter shown in FIG. 3 belongs to the processor PUμ which may be one of the processors PU0 to PU3.

After step 3 is carried out it is decided in step 6, whether any of the signals q0 to q3 indicate that a request of a higher ranking processor PUμ+x is stored in its corresponding circuit LT PUμ+x. If this is true, the requesting processor PUμ must wait for the bus GRANT and step 6 is carried out repeatedly until this becomes untrue.

Each bus participant has a latch generating the signal "EVEN BSM CARD BUSY" and a latch generating the signal "ODD BSM CARD BUSY". These latches are not shown in the drawing. In the general case of more than two memory banks there is such a latch for each memory bank. The corresponding signal EVEN BSM CARD BUSY indicates that the even memory bank M0 is not ready to receive a new command, since it is still busy due to the previous command which is sent to the even memory bank. Thus the signal EVEN BSM CARD BUSY is to protect the even memory bank against command overrun.

The signal BSM CMD indicates that the requesting processor PUμ intends to issue a command on the bidirectional bus 110 which involves a memory operation, since the memory bus may also be used for cross interrogation of the processors without involving the memory.

Each bus participant comprises a further latch which is also not shown. This further latch reminds, if the previous bus command has selected the odd memory bank M1. Then, "—LAST BUS CMD ODD" is active. The inverted output of this further latch is named "—LAST BUS CMD EVEN". This signal is used in the arbiters for odd requests.

An overwrite signal is available "—NO REQUEST ODD" or "—NO REQUEST EVEN", respectively, to get grant if the arbiters for the odd memory card M1 have no request stored in one of their circuits LT PU0 to LT PU3.

In step 7 it is decided whether the last bus command issued by a requesting processor or other bus participant selected the even memory bank M0. If this is the case, step 8 is carried out. In step 8 it is decided whether in the arbiters which are not assigned to the even memory bank M0 any request is stored. If this is true, the control returns back to step 7, so that the requesting PUμ must wait for grant. The above described steps 7 and 8 correspond to the signals "—LAST BUS CMD ODD" and "—NO REQUEST ODD", respectively, as shown in FIG. 3. The output of the AND/INVERT gate 33 is at logical 1, only if the conditions of step 7 or step 8 are fulfilled.

Subsequently it is decided in step 9 whether the even memory bank M0 is still busy. If this is true, it is decided in step 10 whether the command of the requesting processor PUμ is a command involving access to the memory. If this is true, the control returns back to step 9, so that the processor PUμ must wait for grant. If the condition of step 9 or the condition of step 10 are not fulfilled, the signal "PUμ GRANT EV RAW" is generated by the circuit 31. The above described steps 9 and 10 are carried out by the AND/INVERT gate 32 having the inputs "EVEN BSM CARD BUSY" and "BSM CMD". Both of the outputs of the AND/INVERT gates 32 and 33 are fed to the AND gate 34, so that the output of gate 34 is logically high, if the signal "PUμ GRANT EV RAW" is to be generated by the circuit 31. This corresponds to step 11. The circuit 31 generates this signal based on the output of the AND gate 34 and based on the signals q0 to q3. The signal "PUμ GRANT RAW" generated by circuit 31 is fed to AND gate 35 as well as the signal "—XFER DATA ODD" and "—BUS BUSY". The signal "XFER DATA ODD" indicates if it is active, that data from or to the odd memory M1 are transmitted at present on the bus 110. This signal is transmitted via control line 113 shown in FIG. 1. The equivalent signal for the even data "XFER DATA EVEN" is fed via control line to the odd arbiters. The signal "—BUS BUSY" may be raised by any one of the bus participants according to the bus protocol which is explained in the following in more detail. This signal is also fed into the AND gate 36 as well as the signals "PUμ GRANT ODD RAW" and "—XFER DATA EV". The signal "PUμ GRANT ODD RAW" is generated according to the same rules as it is the case for the signal "PUμ GRANT EV RAW".

Thus the signal "GRANT" goes high in step 13 to permit access to the bus to the requesting processor PUμ due to its request to access the even memory bank M0, if the signal "PUμ GRANT EV RAW" is high, the bus is not busy "—BUS BUSY" and no data from or to the odd memory bank M1 are transmitted via the memory bus 110 "—XFER DATA ODD". It is determined in step 12 whether the bus is busy or data from or to the odd memory bank M1 are transmitted. If this is true, the requesting processor waits for "GRANT", so that step 12 is carried out repeatedly.

It is particularly advantageous to provide an additional input to the circuit 31. This additional input provides information to the circuit 31 in order to identify the processor PUμ to which the arbiter and thus the circuit 31 belongs. This makes it possible to employ the same hardware configuration for all of the arbiters assigned to the processors PU0 to PU3: The hardware configuration which is necessary to generate the signal "PUμ GRANT EV RAW" may also be used to generate the corresponding signal for the odd memory bank M1 "PUμ GRANT ODD RAW", when the corresponding inputs are applied. In order to generate the signal "PUμ GRANT ODD RAW", odd requests are to be applied at the inputs REQ PU0 to REQ PU3 of the circuits LT PU0 to LT PU3. Further the signals "EVEN BSM CARD BUSY", "—NO REQUEST ODD" and "LAST BUS CMD ODD" are exchanged against the corresponding odd and even signals, respectively. This is advantageous, since the basic circuit for an arbiter comprising circuit 31 and circuits LT PU0 to LT PU3 is the same regardless for which of the processors and for which of the memory banks the arbiter is used.

In the more general case the memory is logically divided into an arbitrary number n of memory banks. If there is an arbitrary number m of processors utilizing the common memory bus 110, each processor has a number n of these basic circuits. Each of these basic circuits comprises the circuits LT PU0 to LT PUm-1, whereby each of the basic circuits of a specific processor PUμ is assigned to one of the memory banks. Each of the basic circuits generates a signal corresponding to the signal "PUμ GRANT EV RAW" as shown in FIG. 3 for the specific memory bank to which it is assigned. Each of these "GRANT RAW" signals is then input to an AND gate corresponding to one of the AND gates 35 or 36 in order to generate the grant signal GRANT which is output by the OR gate 37. If the number n of memory banks is greater than 2, an additional AND gate is added to the arbitration circuit shown in FIG. 3 for each additional bank. The signal "—BUS BUSY" is fed to this additional AND gate as it is the case for the AND gates 35 and 36. Further the signal "GRANT RAW", which is generated for a specific one of the memory banks to which the basic circuit is assigned, is input into the additional AND gate, as well as an additional signal indicating, that no data are transmitted at present via the bus from or to the memory bank to which the basic circuit considered here is assigned. This signal must also be input into the AND gates 35 and 36.

In the more general case considered here the flowcharts shown in FIGS. 5 and 6 apply analogously. If a predetermined ranking is assigned to the m different processors the logic of the flow-chart shown in FIG. 5 is not to be changed. Thus the procedure to store a specific request of one of the m processors PUμ to access a specific memory bank τ is stored in the circuit LT PUμ in each of the basic circuits which is assigned to this specific bank τ. The procedure shown in FIG. 6 is only slightly modified in the general case considered here. If grant is to be generated due to a request of a processor PUμ to access the memory bank τ, steps 6, 7, 8, 9, and 10 are carried out by a circuit 31 belonging to the basic circuit of the arbiter of the processor PUμ which is assigned to the memory bank τ. In step 6 it is decided whether a request is stored in one of the circuits LT PU0 to LT PUm-1 for another one of the processors having a higher ranking to access the same memory bank τ. The criterion of the decision taken in step 7 is whether the last bus command was to access the memory bank τ, whereas the condition of step 8 is whether any other request to access another one of the banks is active.

The condition of step 9 in the general case is whether the memory bank τ is busy as determined by the corresponding latch, whereas the condition of step 10 is whether the command of the requesting processor μ actually involves the memory. The decision taken in step 12 again serves to determine whether data are transmitted presently on the bus 10. It is to be noted that in the general case each processor PUμ comprises a number n of basic circuits to generate a signal "PUμ GRANT RAW" for each of the n memory banks corresponding to the signal "PUμ GRANT EV RAW" for the even memory card M0. Each of the basic circuits comprises circuits LT PU0 to LT PUm-1 to store requests of any one of the processors to access the corresponding memory bank τ.

The requests which are stored in the circuits LT PU0 to LT PUm-1 in one of the basic circuits constitute a queue of processor requests to access the memory bank τ to which this basic circuit is assigned. A request of the processor PUμ is only queued in the corresponding queue, if the above described conditions are fulfilled. This queue is stored in the circuits LT PU0 to LT PUm-1 of each of the basic circuits being assigned to the memory bank τ. As compared to a central arbiter this concept of distributed arbitration is advantageous, because of the small number of logic gates and circuit wiring between the request input REQ PUμ and the grant signal output GRANT. Therefore request and grant may occur in the same machine cycle. This is not feasible with a centralized arbiter, where two long delay paths—one for request, one for grant—each with an external net are necessary.

Requests of the DMA unit shown in FIG. 1 to access the memory bus 110 may be treated in the same way as requests from the processors, so that the DMA unit comprises the same arbitration means as the processors. However it is advantageous to give the DMA unit priority over processor requests. In this case DMA requests are served always when any request of a processor drops. This may be accomplished by adding additional logic elements to each of the basic circuits of each arbiter to generate a signal indicating that a processor request turned off.

According to a further preferred embodiment of the invention each processor comprises one or more levels of cache memory to reduce the bus traffic. The system performance is increased significantly when the processors contain a level one cache and a large level two cache. The level two cache has an interface to the memory bus 110 as well as to the processor with the level one cache. It contains a two port read/write cache directory. This array hold per available cache line the address of that line and an additional set of control bits. Those are:

1. Valid bit—validates the cache directory entry;
2. modify bit—indicates any modification of the cache line;
3. multiple copy bit—indicates a shared cache line between the processors.

This is to maintain data consistency in the multi-processor system with store-in cache concept. This concept is described in detail in the above cited article by G. Doettling. This concept is realized in the preferred embodiment of the invention considered here even though the concept of different levels of caches may be omitted or another concept to maintain data consistency between the caches may be applied.

In the following timing diagrams of different bus operations are explained in more detail by way of example. FIG. 7 shows a line fetch operation for an even line from the even memory card M0 of the processor PU0. The first row in FIG. 7 indicates the machine cycles 1 to 14 necessary to perform the operation. First, the requesting processor PU0 raises its request line "REQUEST EVEN" which is fed to the corresponding inputs REQ PU0 of the basic circuits assigned to the even memory card. "PU0 GRANT EV RAW" will be given by the arbiter according to the schematic shown in FIG. 3 and 4 and the flow-chart of FIGS. 5 and 6. For effective "GRANT" it is required that the "EVEN BSM CARD BUSY" latch is off, if PU0 requires to send a command CMD to the memory. Each processor and the DMA unit has this latch. It is set by a command cycle to the even BSM card. It is reset when "ALLOW XFER DATA EVEN" is two cycles active. Analogously, the "ODD BSM CARD BUSY" latch exists as well in all processors and the DMA. The purpose of these latches is the following: A processor may be finished with a bus operation involving the memory, but the BSM card is not yet ready to receive a new command, especially at store operations. The latches protect the BSM card against command overrun. Consequently, if there are requests queued in the circuits LT PU to access both of the memory banks, access is granted by the arbiters alternately to the even and the odd memory bank.

The processor proceeds in cycle 2 with "SELECT" which is sent via the control line 111 of FIG. 1 to the memory and further puts the command CMD and the address ADDR on the memory bus. This is indicated in FIG. 7 in the row "MEMORY BUS". The memory initial access time, while the memory card accesses its array and fills its fetch buffer, is used simultaneously by all processors to search in their cache directories if the requested line address is available and valid. This is commonly called "bus snooping". No match was assumed in FIG. 7. This is indicated in the row "CACHE DIR SEARCH" by "NO MATCH". As a result none of the processors drives the common "—BUSY" 118 line from cycle 4 on. "—BUSY" is driven by "open drain" drivers: One or more active drivers may drive a negative polarity. If none of the processors drives this signal this indicates to the requesting processor that no other processor will deliver the required data. Thus the requesting processor PU0 sends the signal "ALLOW XFER DATA EVEN" via control line 114 to the even memory card M0 during one cycle. The memory, if ready, drives "XFER DATA EVEN" and transmits the corresponding signal via control line 112 to the processors. One cycle later, a number of data shots, in this example 4 * 16 bytes, are transmitted via the memory bus 110. During the data transmission the signal "XFER DATA EVEN" remains active.

A line fetch operation with cache match in another processor is shown in FIG. 8a and FIG. 8b. This example differs from the above described example of FIG. 7 in that the cache control logic of the matching processor raises the "—BUSY" line, which is control line 118 in FIG. 1, from cycle 4 on and activates a broadcast request to its own processor. The broadcasting processor will respond after a variable time, depending on its operational state with "PU RESPONSE". This indicates that the requested internal action is done. In this example the multiple copy bit MC is set. This is indicated in FIG. 8a and FIG. 8b in the line "BROADCAST CMD" by the signal "SET MC BIT". Subsequently, the "—BUSY" line is dropped by the other processor in which the match occurred during the "CACHE DIR SEARCH".

The requesting processor PU0 samples the "—BUSY" line 118 in cycle 4. Since the line is active, it sets the own multiple copy bit MC on. The valid bit is turned on in the last cycle when the complete line is in the cache to avoid partial cache updates in case of hardware errors. This is indicated by signal "SET VALID BIT".

The signal "ALLOW XFER DATA EVEN" is set for 1 cycle as soon as "—BUSY" is off. So, the already prepared data transfer from the memory is not delayed or only a little by the cache match in the other processor.

Two variations to the example shown in FIG. 8a and FIG. 8b may happen:

a) The other processor has a match and the multiple copy bit MC is already on in its corresponding cache directory. Thus the other processor raises "—BUSY" for one cycle in cycle 4, but does not interrupt its own processor with a broadcast request.

b) The requesting processor sends a "LINE FETCH DUE TO STORE". This means that a store cycle and not a fetch cycle triggered the line fetch operation. Now it makes no sense to keep the line valid in the matching processor. Therefore the broadcast command is "INVALIDATE LINE" and the requesting processor will not set the multiple copy bit MC. This corresponds to the data consistency concept described in the above cited article by G. Doettling.

Next, a line fetch operation with cast out is explained with reference to FIG. 9a and FIG. 9b. In this case the other processor, here processor PU3, finds a cache match with the modify bit C on. Thus the processor PU3 turns "—BUSY" on. The broadcast command is: Reset the modify bit C and set the multiple copy bit MC, if the memory command was "LINE FETCH DUE TO FETCH". For "LINE FETCH DUE TO STORE" it would be "INVALIDATE LINE".

After "PU RESPONSE", processor PU3 turns "SELECT" on and puts a special cast out command "CAST OUT CMD" on the memory bus. This indicates to the memory card that the original command is cancelled. Therefore "ALLOW XFER DATA EVEN" is not turned on. The processor PU3 rolls out the line on the memory bus 110 from cycle 13 on. One cycle before, the memory card drives "XFER DATA EVEN" upon the receipt of the cast out command. The processor PU0 takes the data as if they came from the memory. The memory receives the data as well. It needs some time to write the data from its store buffer into its array. The memory raises for two cycles "ALLOW XFER DATA EVEN" to indicate readiness for a next command.

Figure 10:
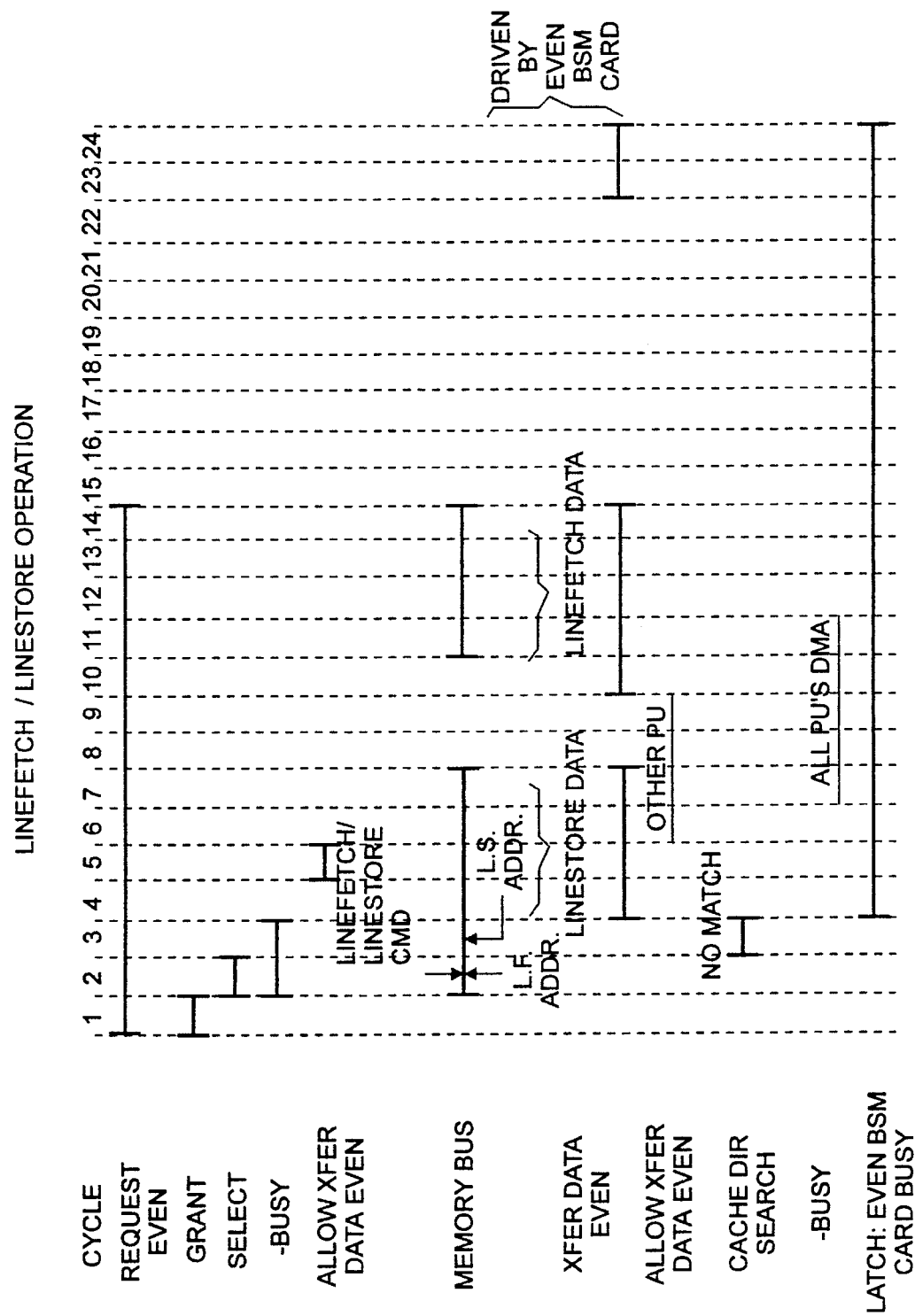

With reference to FIG. 10 a line fetch/line store operation is explained. This operation serves to roll out a changed line to provide space in the cache for another line which is fetched from the even BSM card M0 in the same operation. The command line fetch/line store together with the line fetch address "L.F.ADDR" is put on the memory bus 110 in the selection cycle "SELECT" as indicated by "LINE FETCH/LINE STORE CMD". So the memory starts immediately the fetch access. The other processors search their directories with the line fetch address "L.F.ADDR".

In the next cycle (cycle 3), the line store address L.F.ADDR is on the memory bus 110. The four data shots of the line to be rolled out follow ("LINE STORE DATA"). No broadcasting on the line store address takes place, because the processor PU0 is the only owner of this changed line by definition. Each store data cycle is accompanied by the signal "XFER DATA EVEN". In this example no cache match is assumed in another processor, so that FIG. 7 applies. If there is a cache match the timing diagrams shown in FIG. 8 and 9 apply equivalently. However the first six memory bus cycles take place in any case. The memory card is busy for a longer time as indicated by "LATCH:EVEN BSM CARD BUSY", since the store data in the store buffer are written into the array not before the fetch operation is finished.

Figure 11:
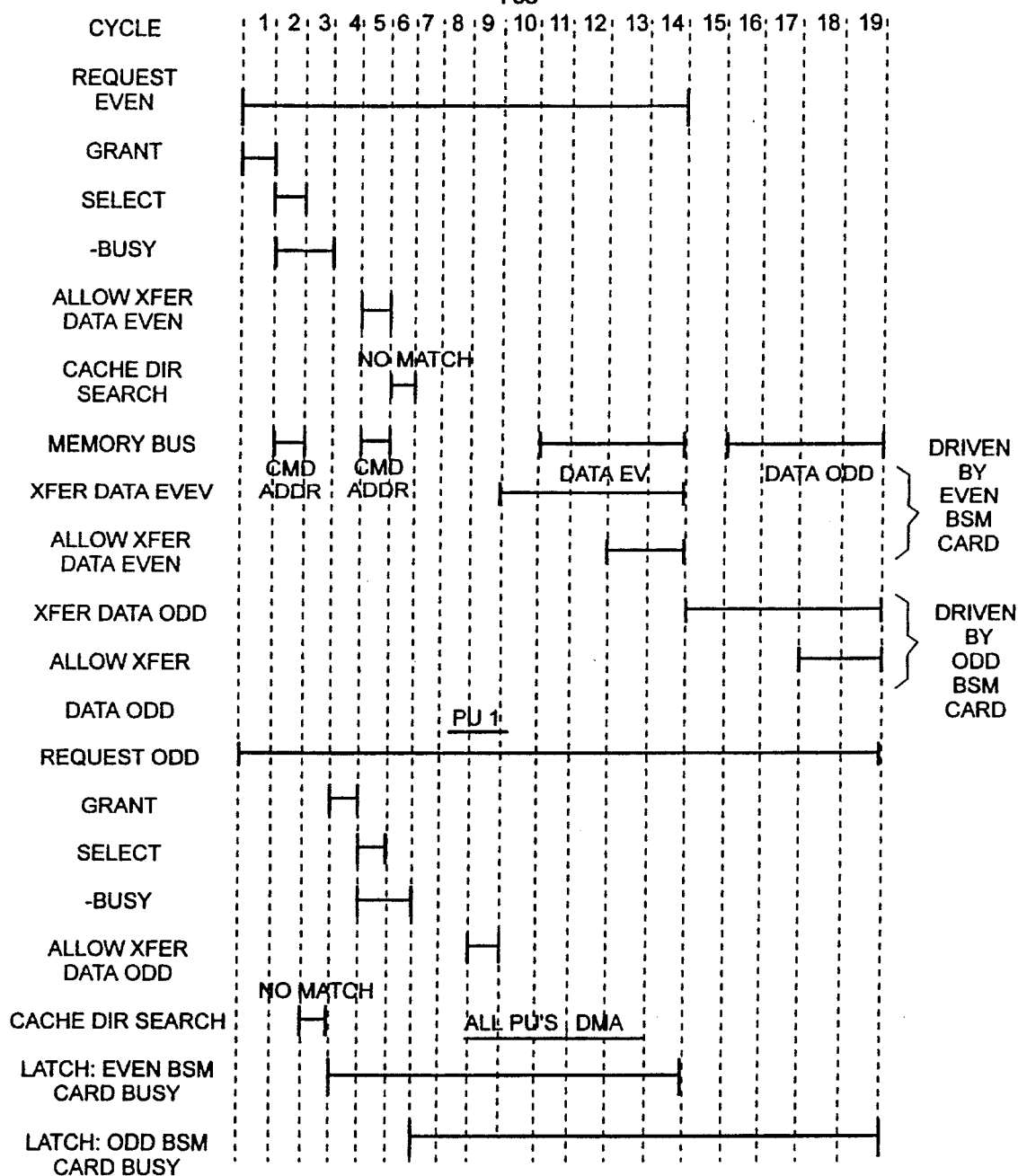

With reference to FIG. 11 now two interleaved line fetches are shown. The processor PU0 raises a request "REQUEST EVEN" and the processor PU1 a request "REQUEST ODD" at the same time. It is assumed, that the processor PU0 gets effective grant "GRANT" first. It puts the selection cycle "SELECT" on the bus in cycle 3 and drives "—BUSY" for two cycles corresponding to the control lines 111 and 118, respectively, shown in FIG. 1. Thus the processor PU0 puts a command CMD together with the address ADDR on the memory bus 110 in order to fetch the corresponding line 1 from the even memory bank M0. No match "NO MATCH" occurred in the cache directory of the processor PU1 as indicated by "CACHE DIR SEARCH" in FIG. 11.

Effective grant "GRANT" for the processor PU1 becomes active in cycle 4, after "—BUSY" turned off. The processor PU1 places now the selection cycle "SELECT" into the gap between command- and data-cycles of the even operation. This gap extends from the end of cycle 3 to the beginning of cycle 10 and is due to the time needed for the even memory bank M0 to access its internal array and to put the required data specified by the address ADDR into its internal buffer. If the request "REQUEST ODD" of the processor PU1 came later, the latest possible effective grant "GRANT" would happen in cycle 9. From then on it is suppressed with "XFER DATA EVEN" corresponding to control line 112 shown in FIG. 1. Since no match "NO MATCH" was assumed in any processor "ALLOW XFER DATA EVEN" and "ALLOW XFER DATA ODD" become active at the earliest possible cycle, which is cycle 5 and 8 respectively, since no cast out occurred as it is the case in the example shown in FIG. 9a and FIG. 9b. The signals "ALLOW XFER DATA EVEN" and "ALLOW XFER DATA ODD" are transmitted via control lines 114 and 115 respectively. The even BSM card M0 provides data "DATA EV." on the bus 110 after the usual initial access time. The odd BSM card M1 waits until an internal memory signal indicates the last data cycle after the transmission of the last data shot 4 in cycle 14 as denoted in FIG. 11. Subsequently the odd BSM card turns on "XFER DATA ODD" corresponding to control line 113 shown in FIG. 1. The data transfer of the "DATA ODD" starts one cycle later in cycle 16.

This timing shows, that two line fetch operations are performed in only 19 cycles. Without the interleaving of the accesses of the processors to the bus the same operation would have taken 2 * 14 cycles. Thus the bus throughput is increased significantly.

Another valuable effect of bus interleaving is shown on FIG. 10: An effective grant "GRANT" due to an odd request "REQUEST ODD" is possible in cycle 8. An odd line fetch operation may take place and is finished in cycle 21 due to the internal access time of the memory. Without interleaving a new selection "SELECT" due to an odd request is not possible earlier than cycle 26, since the even BSM card M0 is busy until cycle 24 as indicated by the signal "LATCH: EVEN BSM CARD BUSY".

Figure 12:
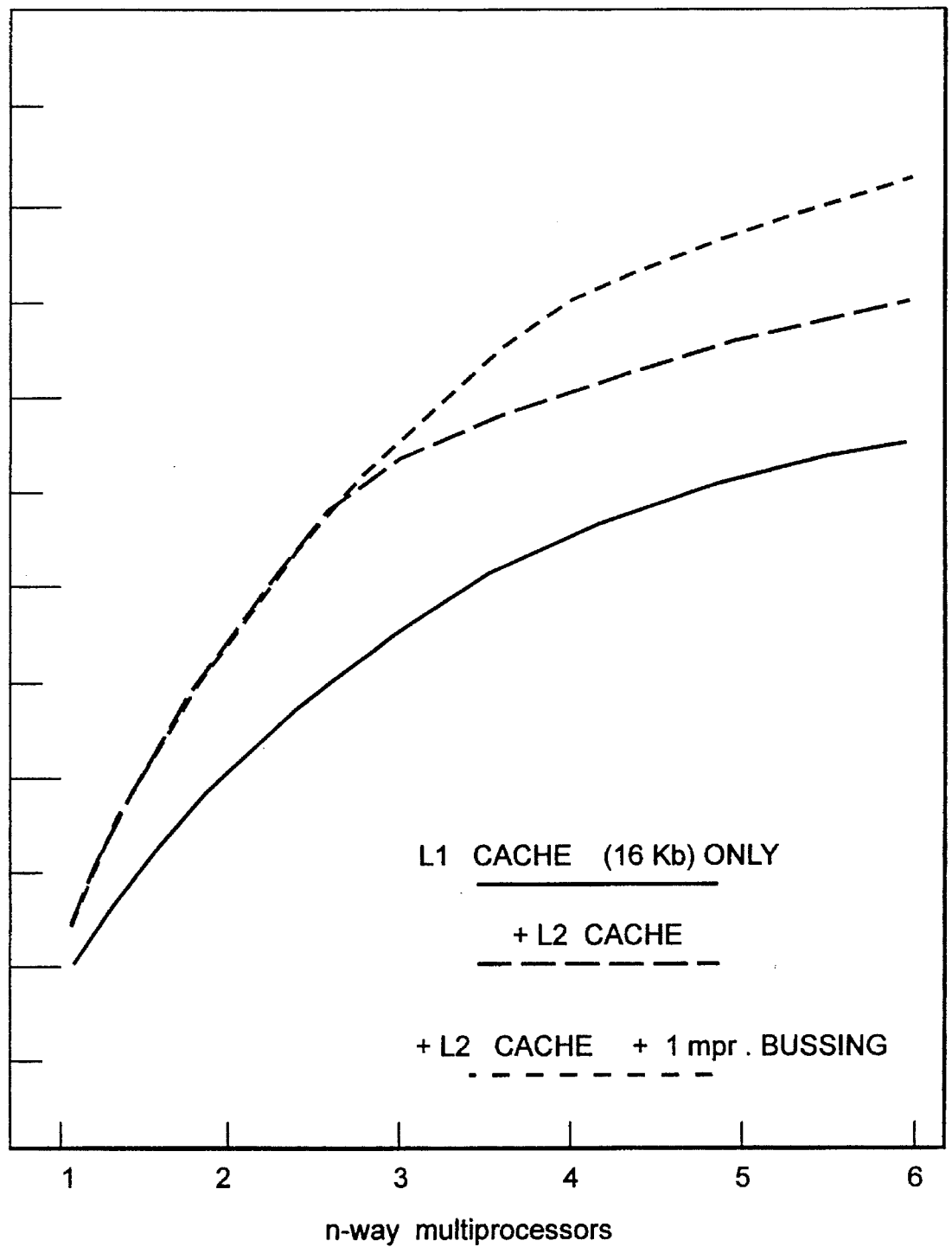
FIG. 12 is a diagram showing the improved performance of a multiprocessor system according to the invention.

In FIG. 12 the improved relative performance of a processor system according to the invention is shown. The curves shown in FIG. 12 indicate the relative performance of a multiprocessor system depending on the number n of multiprocessors. The solid line indicates the performance of a multiprocessor system having only a first level L1 of 16 kB cache memory without bus interleaving. The dashed line shows the corresponding curve but with a second level L2 cache memory. Finally, the dotted line shows the enhanced performance of a multiprocessor system according to the invention having a L2 cache memory and improved bussing.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A multiprocessor system comprising:

a plurality of processors;

storage means for storing information, said storage means being logically divided into a plurality of banks;

a bus interconnecting each of said processors for communication between said processors and interconnecting said processors and said storage means for transmitting said information from said processors to said storage means and from said storage means to said processors;

arbitration means for granting to said processors accesses to said bus in response to requests from said processors to access said banks, wherein a first one of said accesses to said bus is granted to a first one of said processors in response to a request from said first one of said processors to access a first one of said banks, and a second one of said accesses to said bus is granted to a second one of said processors in response to a request from said second one of said processors to access a second one of said banks, said second one of said accesses to said bus granted to said second one of said processors and said second one of said processors issuing an access command to said second one of said banks over said bus during a time when said first one of said banks is carrying out an access command from said first one of said processors;

wherein said processors each have a predetermined ranking and said banks each have a corresponding queue, and wherein said arbitration means comprises means for storing processor requests to access one of said banks in a queue corresponding to said one of said banks, said processor request to access one of said banks queued in a corresponding queue if one of the following conditions is fulfilled:

(a) a request of a higher ranking processor is already queued in said corresponding queue, or (b) condition (a) is not fulfilled and a request from a lower ranking processor is not already queued in said corresponding queue; and wherein said arbitration means grants an access to said bus to a processor whose request to access one of said banks is queued in one of said corresponding queues and (A) there is no request from a higher ranking processor queued in said one of said corresponding queues, and (B) one of the following conditions are fulfilled additionally:

(1) a last access to said bus was granted due to a processor request to access another one of said banks, or (2) if (1) is not fulfilled, there is no request queued in another one of said corresponding queues, and (C) one of the following conditions are fulfilled additionally:

(1) said one of said banks is not busy, or (2) if (1) is not fulfilled, said queued request is not a request to access the memory of said one of said banks and wherein if condition (2) is fulfilled, access to said bus is granted to allow said bus to be used for communication between said processors during a time when one of said banks is carrying out an access command from one of said processors.

2. The multiprocessor system according to claim 1, wherein a number of said banks are assigned to corresponding processors, and wherein said arbitration means is distributed so that each of said corresponding processors has an arbiter for each of said banks assigned to said corresponding processors.

3. The multiprocessor system according to claim 1, wherein said processors each comprise:

a first level of cache memory assigned thereto; and a corresponding first level cache directory, whereby an access to said bus granted to one of said processors is preceded by a bus snooping operation of all other processors to check their cache memory for a cache match in order to maintain data consistency.

4. The multiprocessor system according to claim 1, wherein said multiprocessor system further comprises a direct memory access unit, said direct memory access unit having a highest ranking so that direct memory access unit requests to access one of said banks have priority over said requests from said processors to access said banks.

5. The multiprocessor system according to claim 1, wherein a processor request to access one of said banks is granted in the same machine cycle during which said processor request to access one of said banks was issued.

6. The multiprocessor system according to claim 1, wherein a third one of said accesses to said bus is granted to a third one of said processors in response to a request from said third one of said processors to access a third one of said banks, said third one of said accesses to said bus granted to said third one of said processors and said third one of said processors issuing an access command to said third one of said banks over said bus during a time when said first one of said banks and said second one of said banks are carrying out said access command from said first one of said processors and said access command to said second one of said banks, respectively.

7. The multiprocessor system according to claim 1, wherein at least one other of said accesses to said bus is granted to at least one other of said processors in response to a request from said at least one other of said processors to access at least one other of said banks, said at least one other of said accesses to said bus granted to said at least one other of said processors and said at least one other of said processors issuing an access command to said at least one other of said banks over said bus during a time when said first one of said banks and said second one of said banks are carrying out said access command from said first one of said processors and said access command to said second one of said banks, respectively.

8. The multiprocessor system according to claim 1, wherein a processor request to access one of said banks is granted in the same machine cycle during which an access request from another processor is dropped.

9. A method for granting to processors access to a common bus means in a multiprocessor system, said common bus means coupled to the processors and to storage means, said common bus means adapted to transmit information between the processors and between the processors and the storage means, said storage means logically divided into a plurality of banks, said method comprising the steps of:

a) assigning a rank to each of said processors such that a rank of any one processor is either higher or lower in relation to a rank of any one other processor, b) queuing a request from one of said processors to access one of said banks in a queue, if the following conditions are fulfilled:

A) a request from a higher ranking processor is already queued in said queue, or B) condition A) is not fulfilled and a request from a lower ranking processor is not already queued in said queue, and c) granting access to said bus means in response to said request from said one of said processors if:

(A) there is no said request from a higher ranking processors queued in said queue, and (B) one of the following conditions are fulfilled additionally:

(1) a last access to said bus means was granted due to a request to access another one of said banks, or
(2) if (1) is not fulfilled, there is no request queued in another queue, and (C) one of the following conditions are fulfilled additionally:
(1) said one of said banks is not busy, or
(2) if (1) is not fulfilled, said queued request is not a request to access the memory of said one of said banks and wherein if condition (2) is fulfilled, access to said bus is granted to allow said bus to be used for communication between said processors during a time when one of said banks is already carrying out an access command from one of said processors.

* * * * *